(12) United States Patent
Leuthold et al.

(10) Patent No.: US 12,128,331 B2
(45) Date of Patent: Oct. 29, 2024

(54) METHOD FOR DEGASSING A CROSS-FLOW DIAFILTRATION UNIT, CROSS-FLOW DIAFILTRATION METHOD AND CROSS-FLOW DIAFILTRATION UNIT

(71) Applicant: SARTORIUS STEDIM BIOTECH GMBH, Goettingen (DE)

(72) Inventors: Martin Leuthold, Goettingen (DE); Alexander Helling, Goettingen (DE); Ceren Gencoglu, Goettingen (DE)

(73) Assignee: SARTORIUS STEDIM BIOTECH GMBH, Goettingen (DE)

( * ) Notice: Subject to any disclaimer, the term of this patent is extended or adjusted under 35 U.S.C. 154(b) by 407 days.

(21) Appl. No.: 17/705,907

(22) Filed: Mar. 28, 2022

(65) Prior Publication Data
US 2022/0212125 A1 Jul. 7, 2022

Related U.S. Application Data

(63) Continuation of application No. PCT/EP2020/075983, filed on Sep. 17, 2020.

(30) Foreign Application Priority Data
Sep. 30, 2019 (DE) ...................... 10 2019 006 817.3

(51) Int. Cl.
*B01D 61/10* (2006.01)
*B01D 19/00* (2006.01)
(Continued)

(52) U.S. Cl.
CPC ......... *B01D 19/0031* (2013.01); *B01D 61/10* (2013.01); *B01D 63/08* (2013.01);
(Continued)

(58) Field of Classification Search
None
See application file for complete search history.

(56) References Cited

U.S. PATENT DOCUMENTS

| 5,958,243 A * | 9/1999 | Lawrence | B01D 65/08 |
| | | | 210/741 |
| 11,612,861 B2 * | 3/2023 | Leuthold | B01D 61/16 |
| | | | 210/321.75 |

(Continued)

FOREIGN PATENT DOCUMENTS

| DE | 102016004115 A1 | 10/2017 | |
| FR | 3023281 A1 * | 1/2016 | ........... B01D 61/025 |

(Continued)

OTHER PUBLICATIONS

WO2013159167A8_ENG (WIPO Patentscope machine translation of Pinto de Abreu) (Year: 2013).*

(Continued)

*Primary Examiner* — Gabriel E Gitman
(74) *Attorney, Agent, or Firm* — Edell, Shapiro & Finnan, LLC

(57) ABSTRACT

A method for degassing a cross-flow diafiltration unit, a cross-flow diafiltration method and a cross-flow diafiltration unit. The degassing method includes (i) providing a cross-flow diafiltration unit having a diafiltration channel, a retentate channel and a permeate channel, a first filter material that delimits the diafiltration channel from the retentate channel, and a second filter material that delimits the retentate channel from the permeate channel; and thereafter (ii) feeding a liquid into the retentate channel so that the liquid flows in a flow direction through the retentate channel and penetrates through the first filter material into the diafiltration channel, whereby the retentate channel and the diafiltration channel are filled with and degassed by the liquid.

11 Claims, 10 Drawing Sheets

(51) Int. Cl.
 B01D 63/08 (2006.01)
 B01D 65/02 (2006.01)
(52) U.S. Cl.
 CPC .... B01D 65/022 (2013.01); *B01D 2311/2657* (2013.01); *B01D 2315/10* (2013.01); *B01D 2315/16* (2013.01); *B01D 2321/04* (2013.01)

(56) References Cited

U.S. PATENT DOCUMENTS

2005/0258100 A1   11/2005   Lightfoot
2019/0030486 A1   1/2019    Leuthold et al.

FOREIGN PATENT DOCUMENTS

WO   WO-2008137082 A1 * 11/2008   ........... B01D 61/002
WO   WO-2013159167 A1 * 10/2013   ............. A23L 27/12

OTHER PUBLICATIONS

FR3023281A1_ENG (Espacenet machine translation of Kenzi) (Year: 2016).*
Shrestha "Characterization of Porous Membranes Via Porometry", B.S. Mechanical Engineering, Institute of Engineering, 2008, 104 pages.
Reingruber et al., "Quantitative characterization of microfiltration membranes by 3D reconstruction", Journal of Membrane Science 372 (201, pp. 66-74.
German Office Action with English translation, Application No. 10 2019 006 817.3, May 26, 2020, 9 pages.
International Search Report, PCT/EP2020/075983, Dec. 1, 2020, 4 pages.

* cited by examiner

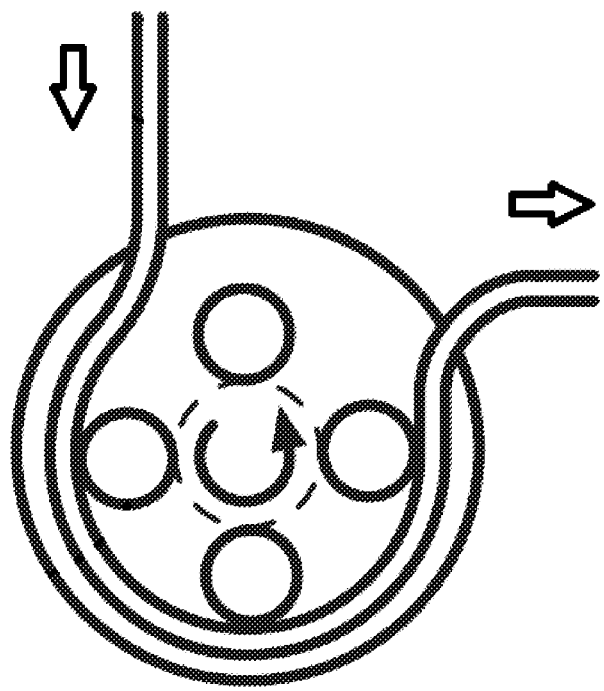
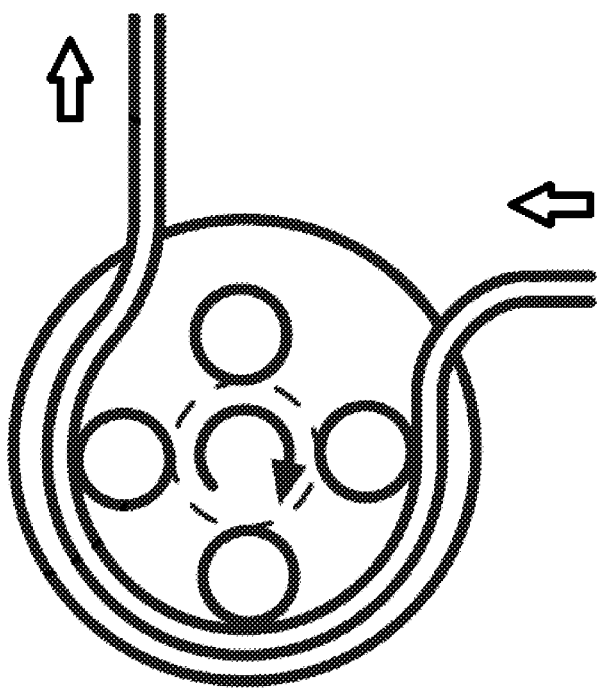
Fig. 15

METHOD FOR DEGASSING A CROSS-FLOW DIAFILTRATION UNIT, CROSS-FLOW DIAFILTRATION METHOD AND CROSS-FLOW DIAFILTRATION UNIT

CROSS REFERENCE TO RELATED APPLICATIONS

This is a Continuation of International Application PCT/EP2020/075983 which has an international filing date of Sep. 17, 2020, and the disclosure of which is incorporated in its entirety into the present Continuation by reference. This Continuation also claims foreign priority under 35 U.S.C. § 119(a)-(d) to and also incorporates by reference, in its entirety, German Patent Application 10 2019 006 817.3 filed on Sep. 30, 2019.

FIELD OF THE INVENTION

The present invention relates to a method for degassing a cross-flow diafiltration unit, a cross-flow diafiltration method and a cross-flow diafiltration unit.

BACKGROUND

Cross-flow diafiltration units and cross-flow diafiltration methods are known from the prior art (see, for example, DE 10 2016 004 115 A1). The diafiltration channel of a cross-flow diafiltration unit is a closed channel, i.e. it is structurally delimited from the retentate channel by a first filter material (for example, a filtration membrane) and typically has an inlet, but no outlet.

Air bubbles can be unintentionally introduced into the diafiltration channel by various means, for example, by upstream pumps. Usually however, the first filter material is not permeable to air bubbles. During normal operation, the air bubbles therefore remain in the diafiltration channel of the cross-flow diafiltration unit and cause the area of the first filter material available for the transfer of the diafiltration medium into the retentate channel to be reduced. Thus, reductions in the functionality of the cross-flow diafiltration unit and/or the efficiency of a cross-flow diafiltration method can result from air bubbles included in the diafiltration channel, which can become noticeable, for example, with a small depletion effect (enrichment effect). Furthermore, due to the reduction in the available area of the filter material, the pressure in the diafiltration channel increases, so that in some circumstances, due to an undershoot in the permissible maximum operating pressure of the cross-flow diafiltration unit, an early cessation of filtration may be required.

SUMMARY

Objects of the present invention include providing an efficient method for degassing a cross-flow diafiltration unit and a cross-flow diafiltration method comprising the method for degassing, as well as providing an efficiently degassable cross-flow diafiltration unit. The above objects are achieved with the embodiments characterized in the claims.

In a first aspect, the present invention relates to a method for degassing a cross-flow diafiltration unit, comprising the steps in the sequence given as (i) providing a cross-flow diafiltration unit with a diafiltration channel, a retentate channel and a permeate channel, wherein a first filter material delimits the diafiltration channel and the retentate channel from one another and a second filter material delimits the retentate channel and the permeate channel from one another; and (ii) feeding a liquid into the retentate channel so that the liquid flows in a flow direction through the retentate channel and passes through the first filter material into the diafiltration channel in order to fill the retentate channel and the diafiltration channel with the liquid and to degas it.

With the degassing method according to the invention, the air bubbles possibly situated in the diafiltration channel of the cross-flow diafiltration unit can be reliably removed. Due to its simple configuration, the degassing method according to the invention requires little effort for its implementation and can therefore be integrated into existing cross-flow diafiltration processes. A further advantage of the degassing method according to the invention lies therein that it can be automated.

The cross-flow diafiltration unit used in the method according to the invention is not subject to any particular restrictions. In particular, the cross-flow diafiltration units disclosed in DE 10 2016 004 115 A1 (cross-flow diafiltration unit for continuous diafiltration) can be degassed in an efficient manner with a degassing method according to the invention.

According to the present invention, the cross-flow diafiltration unit comprises at least one diafiltration channel, a first (preferably flat) filter material, a retentate channel, a second (preferably flat) filter material and a permeate channel arranged such that the first filter material delimits the diafiltration channel and the retentate channel from one another and the second filter material delimits the retentate channel and the permeate channel from one another. Preferably, the diafiltration channel is connected in a fluid conducting manner to at least one inlet for the diafiltration medium, the retentate channel is connected in a fluid conducting manner to at least one inlet for a feed liquid and to at least one outlet for the retentate, and the permeate channel is connected in a fluid conducting manner to at least one outlet for the permeate.

The inlets and outlets identified here each relate to just one diafiltration, retentate and permeate channel of the diafiltration apparatus. In other words, a single channel (diafiltration channel, retentate channel, permeate channel) is assigned to each of the inlets and outlets. The inlets and outlets are therefore not supply channels which supply the whole diafiltration unit (possibly with a plurality of channels of the same type), but rather inlets and outlets of one channel in each case.

The shape (spatial form) of the first and second filter material is not subject to any particular restriction.

DETAILED DESCRIPTION

Preferably, the first and the second filter material are a first flat filter material and a second flat filter material so that the cross-flow diafiltration unit is present as a flat filter module. The expression "flat" indicates that each filter material is present substantially in a single plane. Preferably all the filter materials of the cross-flow diafiltration unit substantially lie in planes that are largely parallel to one another.

In addition, the cross-flow diafiltration unit can be a spiral-wound module. For this purpose, firstly a planar or flat arrangement of the first and second filter material is wound around a core so that the first and second filter material (as well as the diafiltration, retentate and permeate channels) each have a spiral-shaped cross-section.

Furthermore, the cross-flow diafiltration unit can be a hollow fiber module. In this case, the first and second filter material have a hollow fiber form (a cylinder without disk-shaped end portions). The inner diameters of the first and second hollow fiber filter materials are different, so that the first or second filter material can be inserted into the second or first filter material in order to form the diafiltration, retentate and permeate channels.

Where reference is made herein to feeding into the retentate channel, this is preferably carried out via the inlet for the feed liquid. Equally, the discharging from the retentate channel preferably takes place via the outlet for the retentate. The discharging from the permeate channel preferably takes place via the outlet for the permeate. With regard to the diafiltration channel, both the discharging (of the liquid in the degassing method) and also the feeding in (of the diafiltration medium in the cross-flow diafiltration method) take place via the inlet for the diafiltration medium.

It is further preferred that the pore size or the molecular weight cut-off of the first filter material is at least as great as the pore size or the molecular weight cut-off of the second filter material. In addition, the pore size or the molecular weight cut-off of the first filter material is preferably larger than the pore size or the molecular weight cut-off of the second filter material. It is also preferred that the flow rate of the first filter material is greater than the flow rate of the second filter material. For this purpose, the two flow rates are determined under the same conditions except for the filter material used. The determination of the flow rates can be carried out, for example, with water at a predetermined pressure.

According to one preferred embodiment of the present invention, the first filter material has a molecular weight cut-off (MWCO) in the range from 5 kDa to 1500 kDa. The second filter material preferably has a molecular weight cut-off in the range from 1 kDa to 1500 kDa. The determination of the molecular weight cut-off can take place according to the US Standard ASTM E1343-90 ("Standard test method for molecular weight cut-off evaluation of flat sheet ultrafiltration membranes").

The first filter material preferably has a pore size of 0.01 to 50 µm, particularly preferably 0.01 to 0.5 µm. The second filter material preferably has a pore size of less than 0.01 µm.

In order to determine the pore size, according to the invention, at pore sizes of at least 0.1 µm, i.e. for microfiltration membranes with a mean pore size of 0.1 to 10 µm, capillary flow porometry is used. This involves a gas/liquid porosimetry, in which the differential gas pressure levels and flow rates are measured with a membrane sample firstly in the moist state and then in the dry state. Before the measurement, the membrane sample is brought into contact with a wetting liquid in such a way that all of the pores present are filled with this liquid. After filling the pores and introducing the sample, the measuring cell is to be closed and the measurement started. The gas pressure is increased automatically and incrementally after the start of the measurement and the pore diameters corresponding to the applied pressure are emptied by the gas pressure. This process takes place until the relevant pore region has been detected, i.e., until even the smallest pores present in the measuring region are freed of the liquid. Thereafter, the pressure is lowered again and the measurement is repeated automatically on the now dry sample. The difference between the two pressure/flow rate curves is used to calculate the pore size distribution using the Young Laplace equation (see also A. Shrestha, "Characterization of porous membranes via porometry", 2012, Mechanical Engineering Graduate Theses & Dissertations, Paper 38, University of Colorado at Boulder).

In order to determine pore sizes of more than 10 µm to 1 mm, the method described in the Journal of Membrane Science 372 (2011), pages 66 to 74 based on image analysis can be used.

For pore sizes of less than 0.1 µm, according to the invention, the liquid-liquid displacement method is used. This method has similarities with capillary flow porometry. However, in this case it is not the gas flow rates, but rather the flow rates of the displacing liquid that are measured as a function of the differential pressure increase (see also R. Davila, "Characterization of ultra and nanofiltration commercial filters by liquid-liquid displacement porosimetry", 2013).

According to a preferred embodiment of the present invention, the first filter material is a first filtration membrane or the second filter material is preferably a second filtration membrane. Particularly preferably, the first filter material is a first filtration membrane and the second filter material is a second filtration membrane.

As the first filter material, in particular, a porous membrane in the ultrafiltration and microfiltration region is suitable. As the second filter material, an ultrafiltration membrane can advantageously be used. With this embodiment, in the cross-flow diafiltration method described below, using suitable pressure application, a particular quantity of diafiltration medium can be introduced into the diafiltration channel for an optimum diafiltration, and in the degassing method, the liquid can be introduced from the retentate channel into the diafiltration channel by the application of pressure.

The ultrafiltration membranes are characterized by pore sizes of less than 0.01 µm or by molecular weight cut-offs that lie approximately in the molar mass region of 5 to 1500 kDa, whereas the microfiltration membranes have pore sizes in the region of 0.01 to 50 µm, preferably 0.01 to 0.5 µm, or molecular weight cut-offs of 30 to 1500 kDa. The filtration membranes can be made, for example, of polyvinylidene fluoride, cellulose and derivatives thereof, polyethersulfone or polysulfone, although cross-linked cellulose hydrate is particularly preferred.

Preferably, the inlet for the feed liquid is installed in a first edge region of the cross-flow diafiltration unit and the outlet for the retentate is installed in a second edge region of the cross-flow diafiltration unit that lies opposite the first edge region. With this arrangement, in the degassing method/cross-flow diafiltration method, a largely uniform flow direction of the liquid/retentate from the inlet for the feed liquid as the start point to the outlet for the retentate as the end point is defined. The flow direction of the liquid/retentate thereby takes place largely parallel to the flow route along the (flat) filter material, which means substantially without deflections, so that a more stable and reliable flow of the liquid/retentate through the cross-flow diafiltration unit can be ensured. In addition, through the largely straight-line flow pattern without deflections, loops or similar diversions, the pressure fall in the filtration unit and undesirable effects of non-straight-line flows on the target substances contained in the feed liquid can be minimized.

For the reasons set out above, it is also preferred that the inlet for the diafiltration medium is arranged in the second edge region of the cross-flow diafiltration unit. It is also possible, however, to install the inlet for the diafiltration medium in the first edge region or in the third and/or fourth edge region. The cross-flow diafiltration unit has no outlet for the diafiltration medium. During a cross-flow diafiltration, the diafiltration medium leaves the diafiltration channel only via the first filter material. Therefore, in the present preferred embodiments, the at least one inlet for the diafiltration medium is preferably not arranged in opposite edge regions. More preferably, the at least one inlet for the diafiltration medium is arranged exclusively in one of the edge regions without an inlet for the diafiltration medium being arranged in one of the other edge regions.

According to a preferred embodiment of the invention, the outlet for the permeate is installed in the second edge region of the cross-flow diafiltration unit. Particularly preferably, at least one outlet for the permeate is installed in both the first and also the second edge region of the cross-flow diafiltration unit. In a further embodiment of the invention, the outlets for the permeate are alternatively or additionally installed in the third and/or fourth edge region of the cross-flow diafiltration unit. In a plan view of the cross-flow diafiltration unit from the side of the diafiltration channel, the third edge region is situated on the left side of the flow direction. The fourth edge region is accordingly situated on the right side and therefore lies opposite the third edge region. With the above arrangement of the outlet or outlets, a particularly high permeate output can be achieved and constructional advantages can be achieved.

The first edge region preferably comprises the outer third of the length of the filtration unit against the flow direction. The second edge region accordingly comprises the outer third of the length of the filtration unit along the flow direction. A similar situation applies for the third and fourth edge regions. It is advantageous to design the first to fourth edge regions as small as possible. Therefore, the edge regions particularly preferably comprise the respective outer 20%, more preferably the respective outer 10% and most preferably, the respective outer 3%.

In principle, with regard to the installation of the inlets and outlets, there is no particular restriction. For example, the inlets and outlets can be installed so that the feed liquid already enters in the flow direction into the retentate channel and leaves it in the flow direction. Accordingly, the outlet for the permeate can be installed so that the permeate leaves the permeate channel in the flow direction and/or the inlet for the diafiltration medium can be installed so that it enters into the diafiltration channel in the flow direction. Preferably, however, the inlets and outlets are installed so that the diafiltration medium enters the diafiltration channel perpendicularly to the flow direction and the (feed) liquid initially enters the retentate channel perpendicularly to the flow direction and leaves it perpendicularly to the flow direction as the retentate. Such an installation of the inlets and outlets simplifies the arrangement of a plurality of the filtration units according to the invention into a filter cartridge.

Preferably, the cross-flow diafiltration unit has a plurality of inlets for the (feed) liquid, a plurality of outlets for the retentate and a plurality of outlets for the permeate.

The liquid fed into the retentate channel in step (ii) according to the invention is subject to no particular restriction according to the invention. According to the invention, the liquid of step (ii) can be a solvent. The solvent can be, for example, an organic solvent or a mixture of a plurality of organic solvents. Furthermore, the liquid of step (ii) can possibly contain water in addition to one or more organic solvents. According to a preferred embodiment of the present invention, the liquid of step (ii) contains an aqueous solvent. It is particularly preferred that the liquid of step (ii) is water or an aqueous buffer solution. Suitable buffers are, for example, Tris-HCl buffers, potassium phosphate (KPi) buffers, etc.

Step (ii) of the degassing method according to the invention (and also step (iv) of the cross-flow diafiltration method described below) can take place, for example, with the aid of a pump which is connected in a fluid conducting manner to the inlet for the feed liquid (feed liquid supply pump).

In step (ii) of the degassing method according to the invention, typically the retentate channel is firstly filled with the liquid. Any air contained in the retentate channel leaves the retentate channel via the at least one outlet for the retentate. Once the retentate channel is completely filled with the liquid, through the application, for example, of pressure (positive pressure in the retentate channel) or the use of vacuum ("suction" at the inlet for the diafiltration medium, at the retentate outlet and/or at the permeate outlet) the liquid can penetrate through the first filter material into the diafiltration channel, so that any air or air bubbles contained in the diafiltration channel are carried out. The pressure application can take place, for example, with the aid of a valve or a pump. According to a preferred embodiment, a valve is installed on the outlet for the retentate (retentate outlet valve) so that a pressure application can be carried out by closing this valve. The valve can be, for example, a dosing valve or a pinch valve. According to another preferred embodiment, a pump is installed on the outlet for the retentate (retentate discharge pump) so that an appropriate pressure is applied by suitable regulation of this pump.

According to the invention, before step (ii), in an optional step (ii'), the retentate channel is first filled with the liquid. Herein, the volume flow of the liquid that is fed (introduced) into the retentate channel is preferably at least as great, preferably greater than, the volume flow of the liquid that is discharged from the retentate channel. Particularly preferably, the volume flow of the liquid that is fed (introduced) into the retentate channel is at least 18 $Lm^{-2} h^{-1}$ and the volume flow of the liquid that is conducted away from the retentate channel is at least 10 $Lm^{-2} h^{-1}$. The duration of step (ii') is preferably 10 seconds to 5 minutes, particularly preferably 1 to 3 minutes. Via step (ii'), an even more effective degassing of the diafiltration channel in step (ii) can be ensured.

According to a preferred embodiment of the present invention, in step (ii) (and possibly also in step (ii')), the flow direction of the liquid in the retentate channel assumes an angle of more than 90° relative to the direction of the gravitational pull, preferably more than 120°, particularly preferably more than 160°, for example, 180°. Described pictorially, in this preferred embodiment, the liquid in the retentate channel flows at least partially "upwardly." The angle in question can be interpreted, for example, as an angle between two vectors, specifically the angle between the force vector of gravity and the vector which specifies the flow direction of the liquid in the retentate channel.

In addition, it is preferred according to the invention that in step (ii), the flow direction of the liquid in the retentate channel assumes an angle of less than 90° to the direction of gravity, preferably less than 60°, particularly preferably less than 30°, for example, 0°. Described pictorially, in this preferred embodiment, the liquid in the retentate channel flows at least partially "downwardly."

The two preferred embodiments above can be combined with one another. That means that the flow direction can sometimes assume an angle of more than 90° and sometimes an angle of less than 90° to the flow direction of the liquid in the retentate channel.

It is further preferred according to the invention that in step (ii), the first flat filter material is arranged in a plane, the normal to which is not collinear with the direction of gravity. Particularly preferably, the angle between the normal and the direction of gravity is at least 30°, preferably at least 60°, particularly preferably 90°. Particularly preferably, the first flat filter material is arranged so that in a height direction which extends contrary to the direction of gravity, the inlet for the diafiltration medium assumes as high a position as possible. This means that the region of the diafiltration channel in the region of the inlet for the diafiltration medium should be situated higher than the remaining region of the diafiltration channel. With this arrangement, air bubbles situated in the diafiltration channel can escape particularly easily.

In accordance with the preferred embodiments described above in which the first flat filter material is arranged "inclined," the degassing in step (ii) is particularly simplified since air bubbles can escape particularly easily.

According to a further preferred embodiment of the present invention, the cross-flow diafiltration unit provided in step (i) has a pump wherein the diafiltration channel is connected in a fluid conducting manner to the pump and the pump is configured to operate bi-directionally. This pump is herein designated the diafiltration pump. According to this preferred embodiment, in step (ii), the liquid is pumped out of the diafiltration channel by the pump.

The pump (diafiltration pump) of this preferred embodiment that is connected in a fluid conducting manner to the diafiltration channel is subject to no particular restriction, according to the invention, provided it can be operated in two directions. If a cross-flow diafiltration method is carried out with the cross-flow diafiltration unit of this preferred embodiment, then the diafiltration medium can be fed into the diafiltration channel with the diafiltration pump. In the degassing method of this preferred embodiment according to the invention, the diafiltration pump that is provided is operated in the contrary direction (see e.g. FIG. 15) in order to pump the liquid out of the diafiltration channel and to conduct away any air bubbles contained therein. As diafiltration pumps, for example, peristaltic pumps, diaphragm metering pumps and pressure vessels are suitable. (A fluid-filled pressure vessel can have, for example, compressed air (or other gases) or a vacuum (with reversal of the flow direction) applied to it.) With a pressure vessel, a pulsation-free fluid flow can be created in an advantageous manner.) With the aid of a diafiltration pump that is operable in both directions, the degassing method according to the invention can be carried out particularly rapidly and reliably.

In a further preferred embodiment of the present invention, in step (ii), the liquid is fed into the retentate channel so that the liquid penetrates through the first filter material into the diafiltration channel and through the second filter material into the permeate channel in order to fill the retentate channel, the diafiltration channel and the permeate channel with the liquid and to degas them. With this preferred embodiment, not only the diafiltration channel, but also the permeate channel can be degassed.

In a preferred embodiment of the present invention, in step (ii), the volume flow of the liquid that is fed into the retentate channel is greater than the volume flow of the liquid that is discharged from the diafiltration channel. It is further preferred that the volume flow of the liquid that is discharged from the diafiltration channel is greater than the volume flow of the liquid that is discharged from the retentate channel. According to this preferred embodiment, a high proportion of the liquid fed to the retentate channel flows through the diafiltration channel so that degassing takes place in a particularly efficient manner.

It is particularly preferred according to the invention that, in step (ii) the volume flow of the liquid that is fed into the retentate channel is at least 18 $Lm^{-2} h^{-1}$; the volume flow of the liquid that is discharged from the diafiltration channel is at least 10 $Lm^{-2} h^{-1}$; and the volume flow of the liquid that is discharged from the retentate channel is at least 1 $Lm^{-2} h^{-1}$. According to this preferred embodiment, the diafiltration channel is flushed with a high volume flow of the liquid so that a reliable degassing can be ensured.

The volume flow in $Lm^{-2} h^{-1}$ relates to the available (accessible) area of the first filter material (in $m^2$). The available area of the first filter material means the area that is available for cross-flow diafiltration and through which the liquid can flow.

According to a further preferred embodiment of the present invention, the duration of step (ii) is at least 30 seconds, preferably at least 2 minutes, particularly preferably at least 5 minutes. With the minimum duration of step (ii) given above, a sufficient degassing can be ensured.

In a further embodiment of the present invention, after step (ii), the degassing method further comprises the step (iii) of feeding the liquid into the retentate channel and into the diafiltration channel so that the liquid passes out of the (already degassed) diafiltration channel into the retentate channel and out of the retentate channel into the permeate channel. In accordance with this preferred embodiment, not only the diafiltration channel and the retentate channel, but also the permeate channel can be degassed. In addition, undesirable substances (e.g. glycerin as a preservative (in particular for the filter materials/filter membranes) in the event of previous storage of the cross-flow diafiltration apparatus; e.g. glycerin with 20% EtOH or with up to 1M NaOH as a storage solution) can be completely removed.

It is preferred according to the invention that in step (iii) the volume flow of the liquid that is fed into the retentate channel is at least 18 $Lm^{-2} h^{-1}$ and the volume flow of the liquid that is fed into the diafiltration channel is at least 18 $Lm^{-2} h^{-1}$. Through suitably selected volume flows of the liquid, a sufficient degassing of the permeate channel can be ensured. It is also preferred that in step (iii), the volume flow of the liquid that is discharged from the retentate channel is at least 1 $Lm^{-2} h^{-1}$.

The duration of step (iii) is preferably at least 30 seconds, particularly preferably at least four minutes, preferably at least 10 minutes, so that a sufficient degassing of the permeate channel can be achieved.

In a preferred embodiment of the present invention, the degassing method comprises a step (i') of providing at least one further cross-flow diafiltration unit wherein the cross-flow diafiltration unit provided in step (i) can be connected in series or in parallel with the at least one cross-flow diafiltration unit provided in step (i'). An arrangement of this type can also be degassed with the method according to the invention, wherein the at least one further cross-flow diafiltration unit is degassed in addition to the the cross-flow diafiltration unit provided in step (i).

In a further preferred embodiment of the present invention, the cross-flow diafiltration unit provided in step (i) comprises a cross-flow filtration unit connected upstream and/or downstream, as described in greater detail below in relation to the cross-flow diafiltration method according to the invention.

In a further aspect, the present invention relates to a cross-flow diafiltration method comprising the above method for degassing a cross-flow diafiltration unit; as well as the steps (iv) feeding a feed liquid into the retentate channel; (v) discharging the retentate from the retentate channel; (vi) feeding a diafiltration medium into the diafiltration channel; and (vii) discharging the permeate from the permeate channel. The steps (v) to (vii) are preferably carried out simultaneously, which is referred to as "processing."

In the cross-flow diafiltration method according to the invention, the cross-flow diafiltration unit is degassed. Thereby, the full efficiency of the cross-flow diafiltration unit is utilized. In addition, the problem of a premature filtration cessation due to exceeding the permissible maximum operating pressure can be prevented through the degassing according to the invention.

Regarding the time point of the degassing method in the cross-flow diafiltration method of the present invention, there are no particular restrictions. Preferably, the degassing method is carried out at the start of the cross-flow diafiltration method. Alternatively thereto, the performance of steps (iv) to (vii) (that is, the processing) can be interrupted to carry out an intermediate degassing of the cross-flow diafiltration unit and to resume steps (iv) to (vii) thereafter. An intermediate degassing can take place, for example, when the pressure in the diafiltration channel falls below a pre-determined limit value. The pressure in the diafiltration channel can be determined, for example, with a pressure sensor. Alternatively, with the aid of a sensor for detecting air bubbles, it can be ascertained whether, and to what extent, air bubbles are present in the diafiltration channel and, on exceeding a pre-determined limit value, an intermediate degassing can be carried out. Particularly preferably, the degassing method is carried out before steps (iv) to (vii) and more preferably, the degassing method is undertaken both before steps (iv) to (vii) and also at least one intermediate degassing is undertaken.

Step (iv) of the cross-flow diafiltration method according to the invention can be carried out, in principle, by the same components as step (ii) of the degassing method, for example, with the aid of a feed liquid supply pump provided that, in place of the liquid, a feed liquid is fed into the retentate channel.

In the cross-flow diafiltration method according to the invention, fluids such as liquids, emulsions, suspensions, beverages such as beer, wine, juice, water, milk and whey, beer wort, used water and waste water, solutions used in the pharmaceutical, medical, cosmetics, chemical, biotechnology, gene technology, environmental protection and laboratory industries can be utilized as the feed liquid and filtered by diafiltration. They can be used for extracting useful substances, for substance separation, for example of macromolecules and biomolecules, for depyrogenation and sterilization of solutions, for separating harmful substances from fluids, for (dia)filtration and enriching biological solutions, for separating out microorganisms such as bacteria, yeasts, viruses and cell constituents, for demineralization of protein solutions and other biological media. The composition to be obtained according to the invention can therein be either the retentate or the permeate, wherein possibly the permeate or the retentate is disposed of.

Particularly advantageously, the cross-flow diafiltration method according to the invention can be used for filtration, diafiltration, enrichment (reduction of the solvent or water content), and/or changing the ion composition (e.g. demineralization or buffer exchange) of a solution, such as a protein solution.

For the liquid found in the retentate channel, the expressions (feed) liquid and retentate can be used synonymously.

According to a further preferred embodiment of the present invention, the cross-flow diafiltration unit is sanitized before step (iv) by rinsing with a sanitizing solution. During santization, the number of germs possibly present in the cross-flow diafiltration unit is reduced to a minimum. Preferably, the sanitization constitutes a sterilization. During sterilization, a killing of the germs takes place such that they can no longer be detected after the sterilization. The sanitizing solution can be, for example, an aqueous NaOH solution. Preferably, the concentration of NaOH in the aqueous NaOH solution is 0.1 to 1 mol/L. The duration of the sanitization step is subject to no particular restriction and is preferably 10 minutes to 4 hours, particularly preferably 30 to 60 minutes. The sanitization step can include leaving the sanitizing solution to work itself in (soaking). Therein, the rinsing process is temporarily interrupted in order to enhance the effect of the sanitizing solution and/or to minimize the quantity of the sanitizing solution required.

According to a preferred embodiment of the present invention, in the optional sanitization step, the sanitizing solution is fed into the retentate channel and is discharged from the diafiltration channel, the retentate channel and the permeate channel. Herein, the volume flow of the sanitizing solution that is fed into the retentate channel is preferably at least $10 \, Lm^{-2} \, h^{-1}$, the volume flow of the sanitizing solution that is discharged from the diafiltration channel is at least $1 \, Lm^{-2} \, h^{-1}$, the volume flow of the sanitizing solution that is discharged from the retentate channel is at least $1 \, Lm^{-2} \, h^{-1}$, and the volume flow of the sanitizing solution that is discharged from the permeate channel is at least $1 \, Lm^{-2} \, h^{-1}$.

According to a preferred embodiment of the present invention, in the optional sanitization step, the sanitizing solution is fed into the diafiltration channel and is fed into the retentate channel and is discharged from the retentate channel and the permeate channel. The volume flow of the sanitizing solution that is fed into the retentate channel is herein preferably at least $5 \, Lm^{-2} \, h^{-1}$, the volume flow of the sanitizing solution that is fed into the diafiltration channel is at least $5 \, Lm^{-2} \, h^{-1}$, the volume flow of the sanitizing solution that is discharged from the retentate channel is at least $1 \, Lm^{-2} \, h^{-1}$, and the volume flow of the sanitizing solution that is discharged from the permeate channel is at least $1 \, Lm^{-2} \, h^{-1}$.

According to a particularly preferred embodiment of the present invention, the cross-flow diafiltration unit is rinsed with a rinsing solution before step (iv). If a sanitization is carried out, the rinsing preferably takes place after the sanitizing. The rinsing solution is not subject to any particular restriction. Preferably water or an aqueous buffer solution is used as the rinsing solution.

Preferably, in the rinsing step, the rinsing solution is fed into the retentate channel and is discharged from the diafiltration channel, the retentate channel and the permeate channel. Herein, the volume flow of the rinsing solution that is fed into the retentate channel is preferably at least $20 \, Lm^{-2} \, h^{-1}$, the volume flow of the rinsing solution that is discharged from the diafiltration channel is at least $5 \, Lm^{-2} \, h^{-1}$, the volume flow of the rinsing solution that is discharged from the retentate channel is at least $5 \, Lm^{-2} \, h^{-1}$, and the volume flow of the rinsing solution that is discharged from the permeate channel is at least $5 \, Lm^{-2} \, h^{-1}$.

It is further preferred that in the optional rinsing step, the rinsing solution is fed into the diafiltration channel and the retentate channel and is discharged from the retentate channel and the permeate channel. Herein, the volume flow of the rinsing solution that is fed into the retentate channel is preferably at least $5 \, Lm^{-2} \, h^{-1}$, the volume flow of the rinsing solution that is fed into the diafiltration channel is at least $5 \, Lm^{-2} \, h^{-1}$, the volume flow of the rinsing solution that is discharged from the retentate channel is at least $5 \, Lm^{-2} \, h^{-1}$, and the volume flow of the rinsing solution that is discharged from the permeate channel is at least 5 $Lm^{-2} h^{-1}$.

According to the invention, it is further preferred that in step (iv), firstly the feed liquid is fed into the retentate channel without carrying out steps (v) to (vii) until a predetermined transmembrane pressure is reached in the retentate channel. This step can be referred to as "ramping up." Following the ramping up (reaching the predetermined transmembrane pressure), steps (iv) to (vii) are carried out in parallel (simultaneously). The ramping up step has the result that right at the start of the cross-flow diafiltration, equilibrium conditions largely exist in the retentate channel. As the ramping up step, rather than feeding in the feed liquid until a particular transmembrane pressure is reached, the retentate can be moved in a circulating manner in the retentate channel until equilibrium conditions are achieved. "In a circulating manner" herein means that the feed liquid is fed into the retentate channel, the retentate is discharged from the retentate channel and the retentate discharged from the retentate channel is fed as feed liquid to the retentate channel. The achievement of equilibrium conditions can be detected, for example, in that a particular parameter measured in the retentate channel no longer changes. The parameter can be measured, for example, with a UV sensor.

The transmembrane pressure TMP or $p_{TMP}$ can be defined as the arithmetic mean of the pressure at the inlet for the feed liquid $p_{in}^{ret}$ and of the pressure at the outlet for the retentate $p_{out}^{ret}$ less the pressure at the outlet for the permeate $p_{out}^{per}$ $$p_{out}^{per}\left(p_{TMP} = \frac{1}{2}(p_{in}^{ret} + p_{out}^{ret}) - p_{out}^{per}\right).$$

The pressures and $p_{in}^{ret}$, $p_{out}^{ret}$ and $p_{out}^{per}$ can be measured, for example, by sensors installed at the inlet for the feed liquid, at the outlet for the retentate and at the outlet for the permeate.

As already mentioned above, it is preferred that, in the cross-flow diafiltration method according to the invention, steps (iv) to (vii) are carried out at least partially in parallel (simultaneously), which can be referred to as "processing."

The processing step is carried out according to a preferred embodiment such that the respective volume flow of the feed liquid, the retentate, the diafiltration medium and the permeate is largely constant. In this context, "largely" means that the ratio of the highest volume flow to the lowest volume flow is not more than 1.10, preferably not more than 1.05, particularly preferably not more than 1.01.

According to a further preferred embodiment of the present invention, the processing step is operated so that the transmembrane pressure remains largely constant. In this context, "largely" means that the ratio of the highest TMP to the lowest TMP is not more than 1.10, preferably not more than 1.05, particularly preferably not more than 1.01. A fall in the TMP can be equalized, for example, by an increased feeding of the feed liquid, and a rise in the TMP can be equalized by a reduced feeding of the feed liquid. Furthermore, an adaptation of the TMP by regulating the retentate outlet valve can be achieved: on increasing the flowthrough by further opening the retentate outlet valve, the TMP falls and by further closing the retentate outlet valve, it rises. Accordingly, an adaptation of the TMP can take place by regulating a possibly provided retentate discharge pump.

In order to keep the diafiltration factor constant, in the event of a corresponding adaptation, the volume flow of the diafiltration medium fed in is preferably equalized accordingly. The diafiltration factor is the ratio of (a) the volume flow of the diafiltration medium fed in to (b) the volume flow of the feed liquid fed in.

The diafiltration medium used is not subject to any particular restriction. In principle, any fluid is suitable, although water and aqueous salt solutions are preferred. Particularly preferred as the diafiltration medium is an aqueous buffer solution, and the same buffers are suitable as those for the liquid of step (ii).

A step (viii) of the recovery of the feed liquid (product recovery) preferably follows steps (iv) to (vii) of the diafiltration method according to the invention. For this purpose, the cross-flow diafiltration unit can be rinsed with a recovery fluid. The recovery fluid is not subject to any particular restriction. In principle, any fluid is suitable. For example, the recovery fluid can be a gas such as nitrogen or argon. Preferably, the recovery fluid is a recovery liquid, for example, an oil or polyethylene glycol, although water and aqueous salt solutions represent preferred recovery liquids. In step (viii), the recovery liquid is preferably fed into the retentate channel and is discharged from the retentate channel. The volume flow into the retentate channel in step (viii) is preferably at least 1 $Lm^{-2} h^{-1}$.

A cleaning (purification) step (ix) preferably follows steps (iv) to (vii) (and possibly (viii)) of the cross-flow diafiltration method according to the invention. The statements set out above regarding the sanitization step apply accordingly for the cleaning step.

Preferably, as the last step (x) of the cross-flow diafiltration method according to the invention, the cross-flow diafiltration apparatus can be emptied. In the emptying step, preferably a gas is fed into the diafiltration channel and/or into the retentate channel, until no more liquid can be discharged from the retentate channel and the permeate channel. If a cross-flow diafiltration apparatus with a diafiltration pump, a feed liquid pump and a retentate pump and possibly a retentate outlet valve is used, for step (x) the retentate outlet valve is opened and the diafiltration pump and the retentate pump can be operated at a volume flow of at least 18 $Lm^{-2} h^{-1}$. Therein, the diafiltration pump is operated preferably only for as long as the diafiltration pressure is less than 1.5 bar. The diafiltration pressure can be measured, for example, with a sensor installed at the inlet for the diafiltration medium.

According to the invention, in the cross-flow diafiltration method according to the invention, before step (iv), a step of concentrating or diluting the feed liquid can take place, wherein the diluted or concentrated feed liquid is fed into the retentate channel in step (iv). Preferably, the aforementioned step is a step of concentration of the feed liquid. The step of concentration of the feed liquid before step (iv) is preferably carried out with a cross-flow filtration unit. The cross-flow filtration unit comprises a retentate channel and a permeate channel, wherein the retentate channel and the permeate channel are delimited from one another by a (preferably flat) filter material. The cross-flow filtration unit can be connected to the retentate channel of the cross-flow diafiltration apparatus via a deflection apparatus, such as described for example in DE 10 2018 004 909 A1 (see FIG. 1, 5, 13, 14). Alternatively, the cross-flow filtration unit and the cross-flow diafiltration unit can be arranged separated from one another, for example, each in a filter holder. Furthermore, the cross-flow filtration unit and the cross-flow diafiltration unit can be arranged together in a common housing.

According to the invention, in the cross-flow diafiltration method according to the invention, after step (v), a step of concentrating or diluting the retentate can take place, wherein for this purpose, the retentate discharged in step (v) from the retentate channel is used. Preferably, the aforementioned step is a step of concentration of the retentate. The step of concentrating the retentate after step (v) is preferably carried out with a cross-flow filtration unit. With regard to this cross-flow filtration unit, the statements set out above regarding the step of concentrating or diluting the feed liquid before step (iv) apply accordingly.

In the cross-flow diafiltration method according to the invention, the processing can be carried out multiple times one after the other, possibly in the cross-flow diafiltration units provided in steps (i) and (i'), which can be connected in parallel and/or in series.

Furthermore, the retentate or the permeate can be further treated after step (v) or (vii), for example, by a filtration step, preferably a sterile filtration step (see FIG. 3).

In a further aspect, the present invention relates to a cross-flow diafiltration unit with a diafiltration channel, a retentate channel and a permeate channel, wherein a first (preferably flat) filter material delimits the diafiltration channel and the retentate channel from one another and a second (preferably flat) filter material delimits the retentate channel and the permeate channel from one another. The diafiltration channel is connected in a fluid conducting manner to a pump and the pump can be operated in two directions. The cross-flow diafiltration unit according to the invention can be degassed particularly efficiently with the aid of the diafiltration pump that is operable in two directions.

The statements set out above regarding the degassing method according to the invention as well as the cross-flow diafiltration method according to the invention and the statements below regarding the cross-flow diafiltration unit according to the invention are applicable to one another interchangeably.

As mentioned above, the cross-flow diafiltration unit according to the invention can have, for example, the form of a flat filter module, a spiral-wound module or a hollow fiber module, whereas the cross-flow diafiltration unit according to the invention is preferably a flat filter module.

According to a preferred embodiment of the present invention, the diafiltration pump is a peristaltic pump. Preferably, the peristaltic pump is configured as a pump with at least 3 defined pipe dimensions, so that, in accordance with the pipe diameters in the cross-flow diafiltration method according to the invention, the relevant volume flow of the diafiltration medium fed in, of the feed liquid fed in and of the discharged retentate and of the discharged permeate can be adjusted. As shown in FIG. 15, a peristaltic pump operates bi-directionally, i.e., can be operated in two directions.

As illustrated by way of preferred embodiment e.g. in FIG. 3, addition to a diafiltration pump $P_D$, the cross-flow diafiltration unit according to the invention preferably has a feed liquid pump $P_S$ for feeding in the feed liquid, a retentate pump $P_R$ for discharging the retentate and/or a permeate pump for discharging the permeate. One or more of the pumps can be replaced by a valve. For example, the cross-flow diafiltration unit can have a feed liquid pump and a retentate valve or a feed liquid valve and a retentate pump. Accordingly, in place of a permeate pump, the cross-flow diafiltration unit can have a permeate valve. With regard to suitable pumps and valves, the statements set out above apply accordingly.

According to a preferred embodiment, the cross-flow diafiltration unit has at least one air filter which is connected in a fluid conducting manner to the diafiltration channel. Preferably, the air filter is a sterile filter. Air can escape through the air filter during degassing.

As set out above, in principle according to the present invention, the retentate channel can firstly be degassed in that liquid (e.g. buffer, feed liquid) is pumped into the retentate channel, and a portion of the liquid is let out of the outlet for the retentate, until no more air bubbles emerge from the retentate channel.

Thereafter, the diafiltration channel can be degassed in that liquid is pumped into the filled retentate channel and a portion of the liquid is pumped out of the diafiltration channel until no more air bubbles emerge from the diafiltration channel.

Both steps can also be carried out simultaneously until no more air bubbles emerge from the retentate channel and the diafiltration channel.

According to the present invention, the sequence of the degassing method can be automated. The regulation and the sequence of the individual degassing steps can be carried out via a plurality of parameters independently or in combination.

The regulation can be based according to the invention, for example, on an air bubble detection. The air bubble detection can take place, for example, based on an ultrasonic detection or in accordance with a thermoelectric principle. Ultrasonic sensors for measuring volume flows are often already capable of detecting air bubbles. The degassing process is then continued at least until no more air bubbles emerge from the diafiltration channel and the retentate channel. Where appropriate, a time interval must be selected, over the duration of which no more air bubbles are to be detected so that the process is ended only once sufficient degassing has taken place.

Furthermore, the regulation can be carried out according to the invention in accordance with a volume detection. If the empty volume of the cross-flow diafiltration unit and of the pipe connections and components attached thereto is known, the regulation can be carried out via the volume of degassing liquid (e.g. buffer, feed liquid) used. In addition, sufficient degassing liquid is fed into the cross-flow diafiltration unit and the attached pipe connections and components until the empty volume is completely filled. Since the air does not escape all at once, the volume of the degassing liquid must typically be greater than the empty volume.

Furthermore, the regulation can alternatively be carried out according to the invention in accordance with a time measurement. For this, the volume flows into and out of the cross-flow diafiltration unit must be known. It can thus be calculated how long the degassing liquid must flow into the retentate channel until the empty volume of the cross-flow diafiltration unit and the pipe connections and components attached thereto is completely filled. Since the air does not escape all at once, the stop time must typically be longer than the value calculated from the empty volume.

Since the volume detection and the time measurement are indirect methods for determining the cessation criterion of degassing, according to the invention, the method of direct air bubble detection is preferred.

REFERENCE SIGNS $P_D$ Diafiltration pump
$P_S$ Feed liquid supply pump
$P_R$ Retentate discharge pump
LF Sensor for measuring conductivity
F Sensor for measuring volume flow
P Sensor for measuring pressure

BRIEF DESCRIPTION OF THE DRAWINGS

FIG. 15 shows a peristaltic pump operable in two directions. The two possible pumping directions are indicted by arrows.

Figure 1:
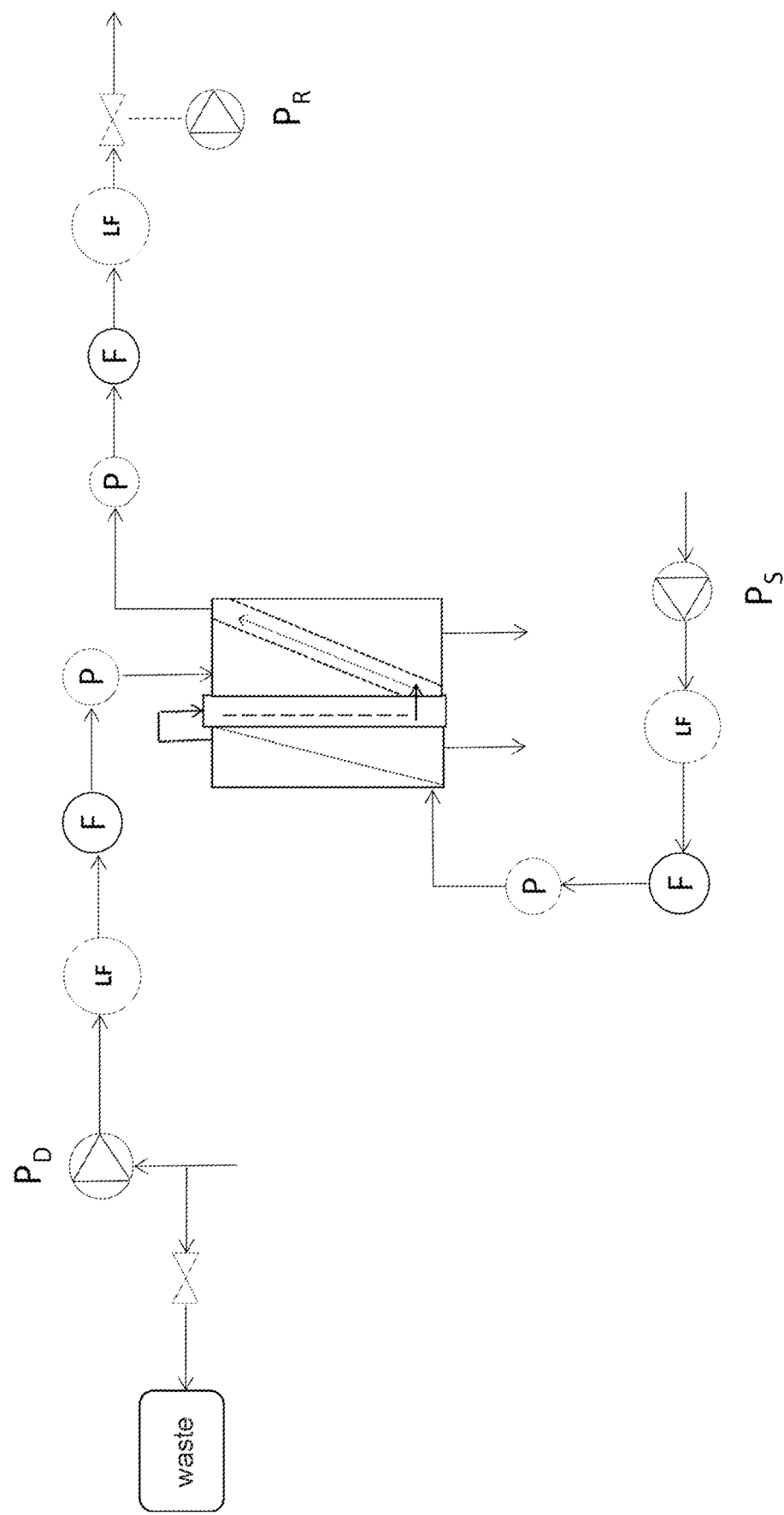
FIG. 1 shows a cross-flow diafiltration unit according to the invention with a diafiltration pump, which can be operated in two directions, wherein a cross-flow filtration unit is connected upstream of the cross-flow diafiltration unit for concentrating the feed liquid, wherein the cross-flow filtration unit is connected by a deflection apparatus to the cross-flow diafiltration unit. The branch before the diafiltration pump, which leads to the waste, can be opened via a valve for degassing.
Figure 2:
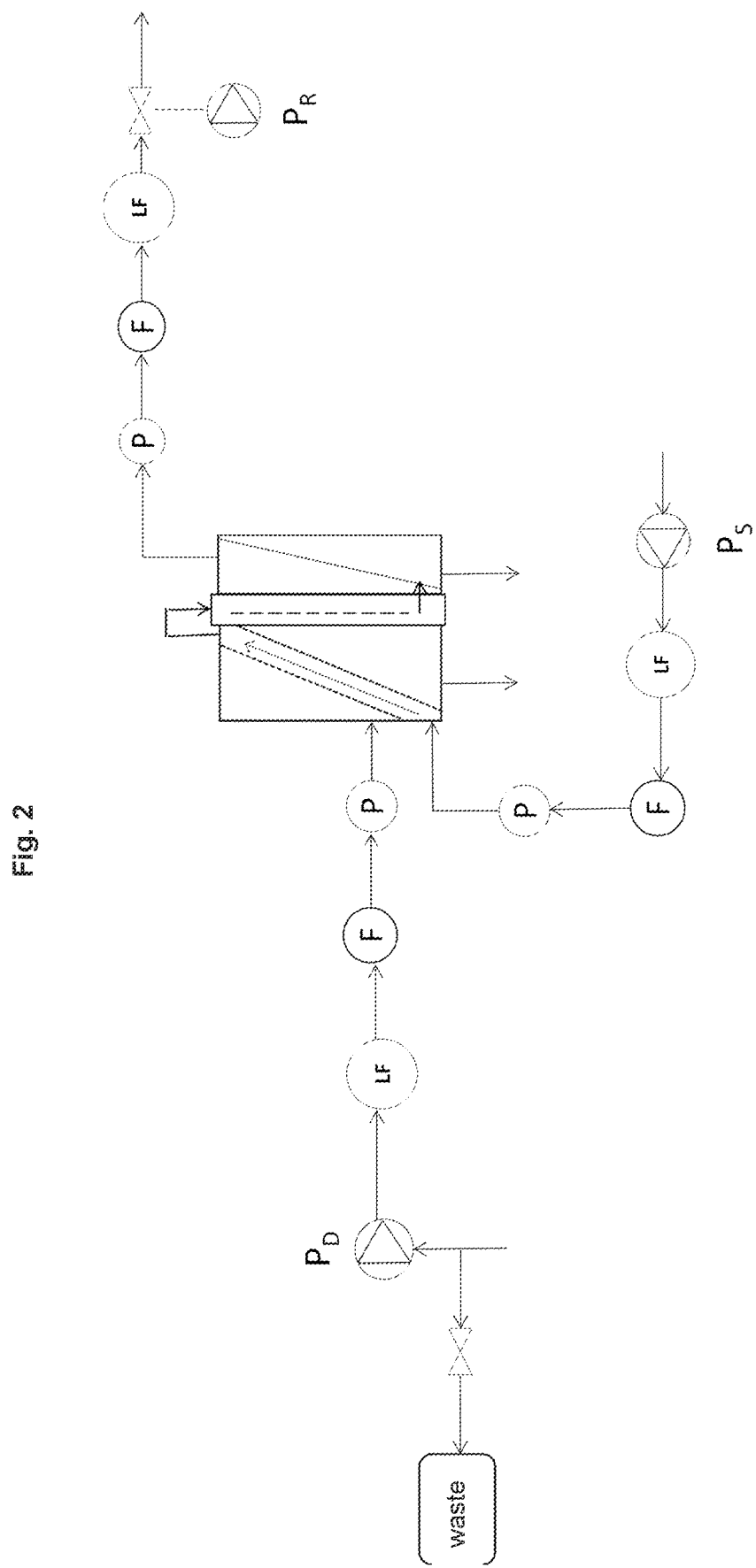
FIG. 2 shows a cross-flow diafiltration unit according to the invention with a diafiltration pump, which can be operated in two directions, wherein a cross-flow filtration unit is connected downstream of the cross-flow diafiltration unit for concentrating the feed liquid, wherein the cross-flow filtration unit is connected by a deflection apparatus to the cross-flow diafiltration unit. The branch before the diafiltration pump, which leads to the waste can be opened via a valve for degassing.
Figure 3:
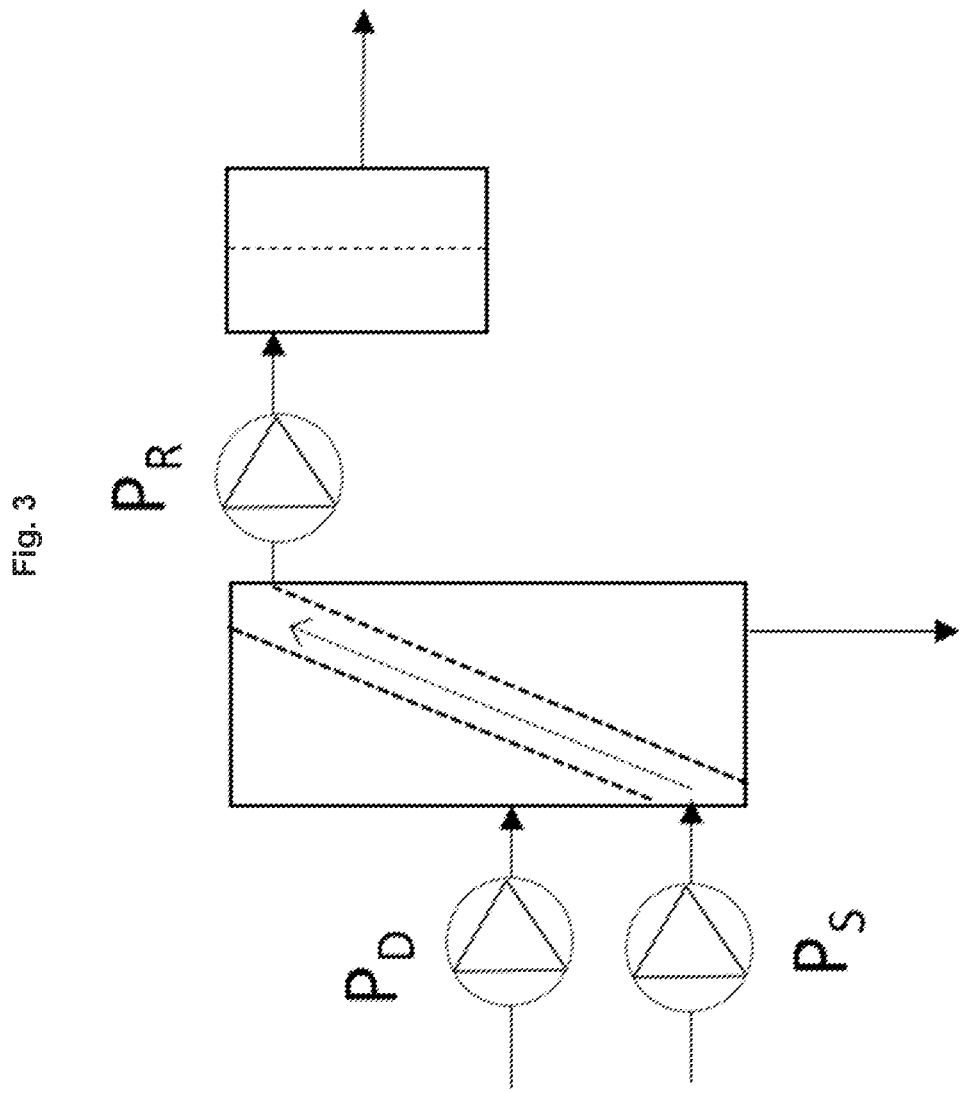
FIG. 3 shows a cross-flow diafiltration unit according to the invention with a diafiltration pump, which can be operated in two directions, wherein a sterile filtration unit is connected downstream of the cross-flow diafiltration unit for filtering the retentate.
Figure 4:
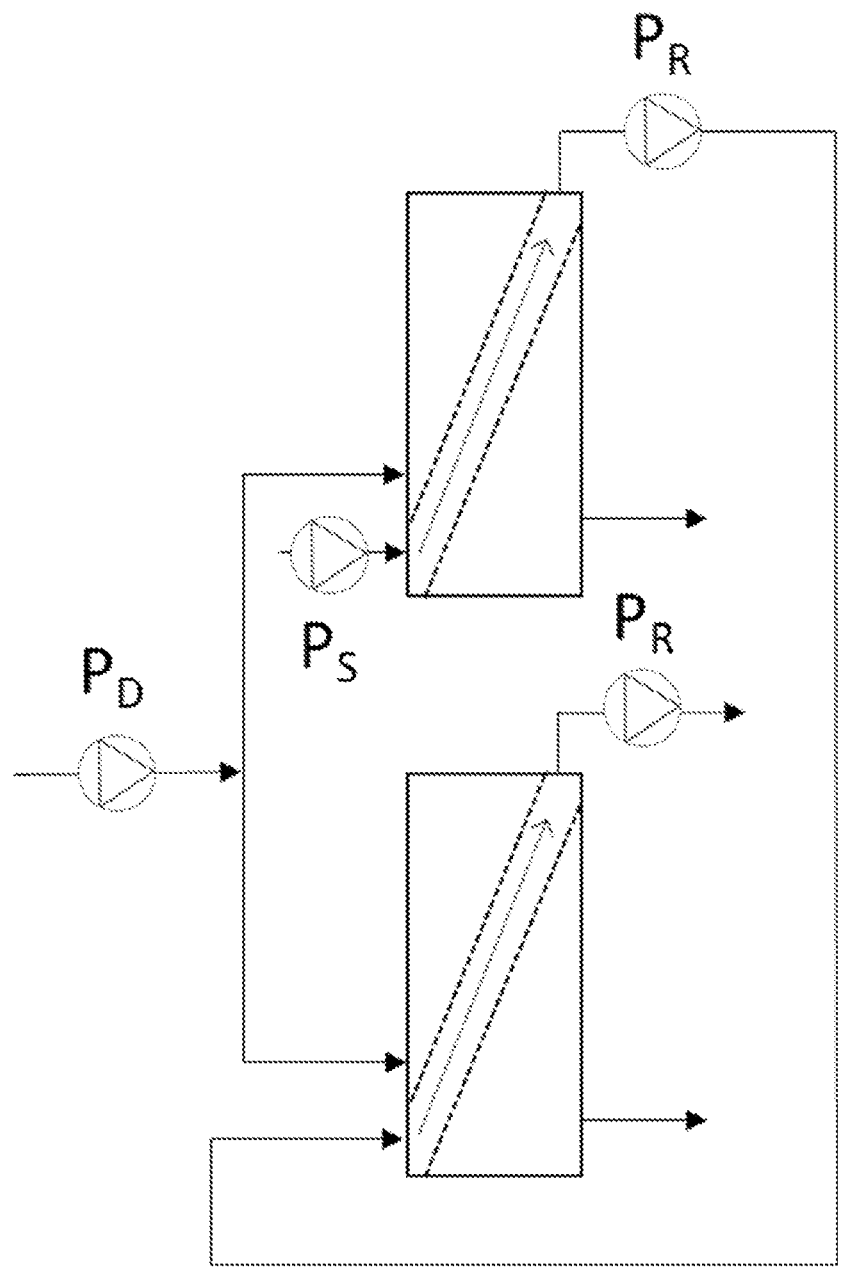
FIG. 4 shows an arrangement according to the invention of diafiltration units connected in series, wherein the retentate of the upper unit is used as the feed liquid of the lower unit. The diafiltration is herein connected in parallel. This means that the diafiltration medium is fed from a single source with only one diafiltration pump.
Figure 5:
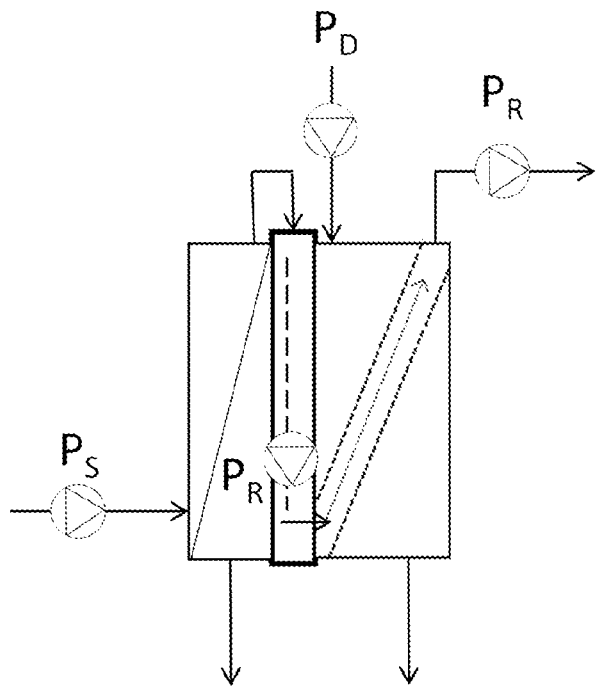
FIG. 5 shows a cross-flow diafiltration unit according to the invention with a cross-flow filtration unit connected upstream and a deflection apparatus having a pump.
Figure 6:
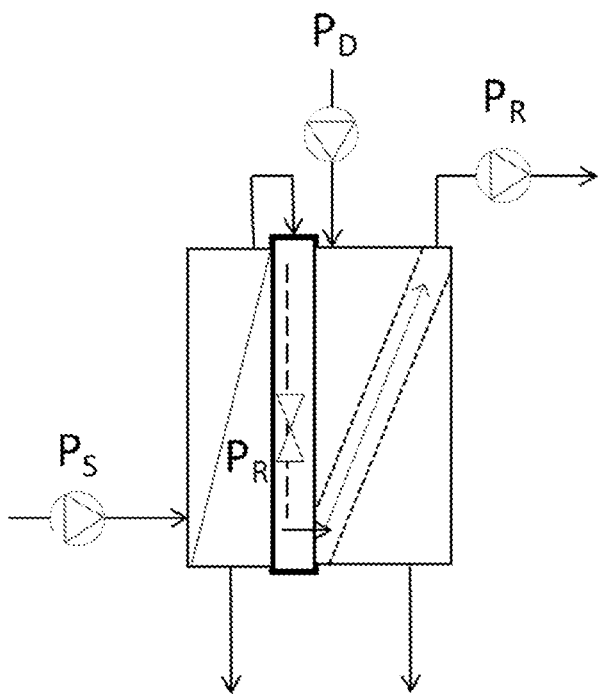
FIG. 6 shows a cross-flow diafiltration unit according to the invention with a cross-flow filtration unit connected upstream and a deflection apparatus having a valve.
Figure 7:
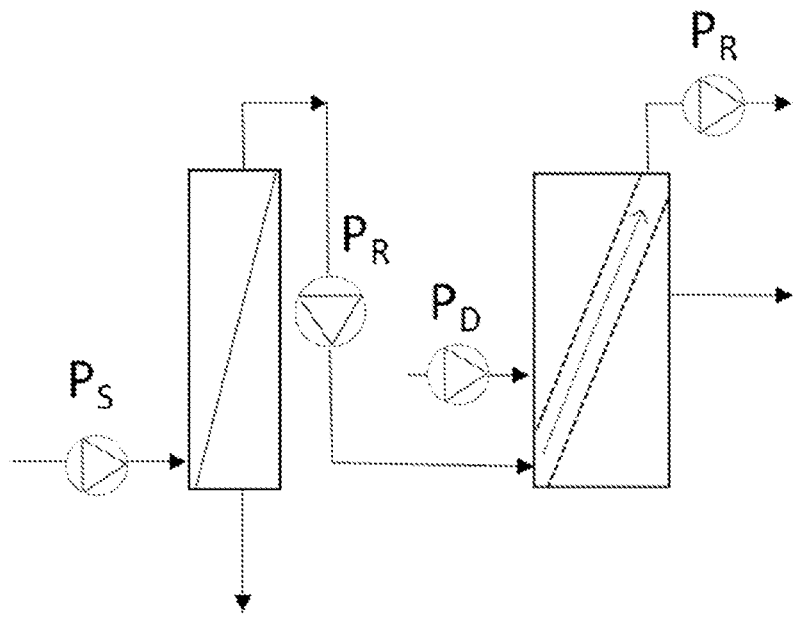
FIG. 7 shows a cross-flow diafiltration unit according to the invention with a cross-flow filtration unit connected upstream and a connection between the cross-flow filtration unit and the cross-flow diafiltration unit having a pump. The cross-flow filtration unit and the cross-flow diafiltration unit can be fixed with the aid of holders.
Figure 8:
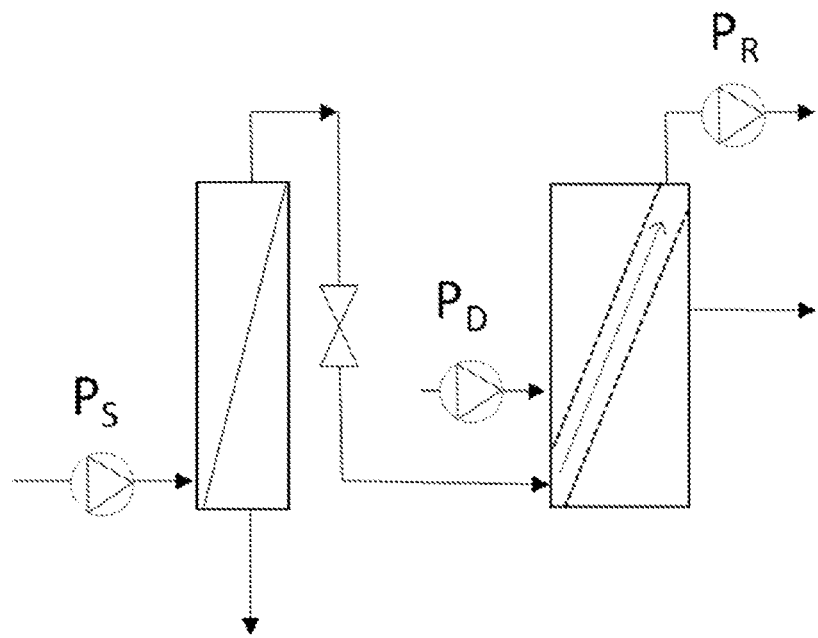
FIG. 8 shows a cross-flow diafiltration unit according to the invention with a cross-flow filtration unit connected upstream and a connection between the cross-flow filtration unit and the cross-flow diafiltration unit having a valve. The cross-flow filtration unit and the cross-flow diafiltration unit can be fixed with the aid of holders.
Figure 9:
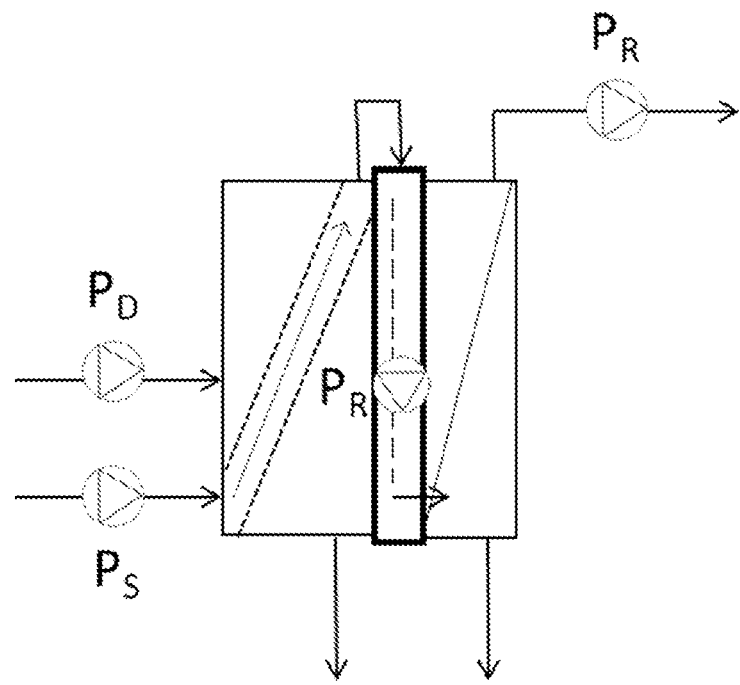
FIG. 9 shows a cross-flow diafiltration unit according to the invention with a cross-flow filtration unit connected downstream and a deflection apparatus with a pump.
Figure 10:
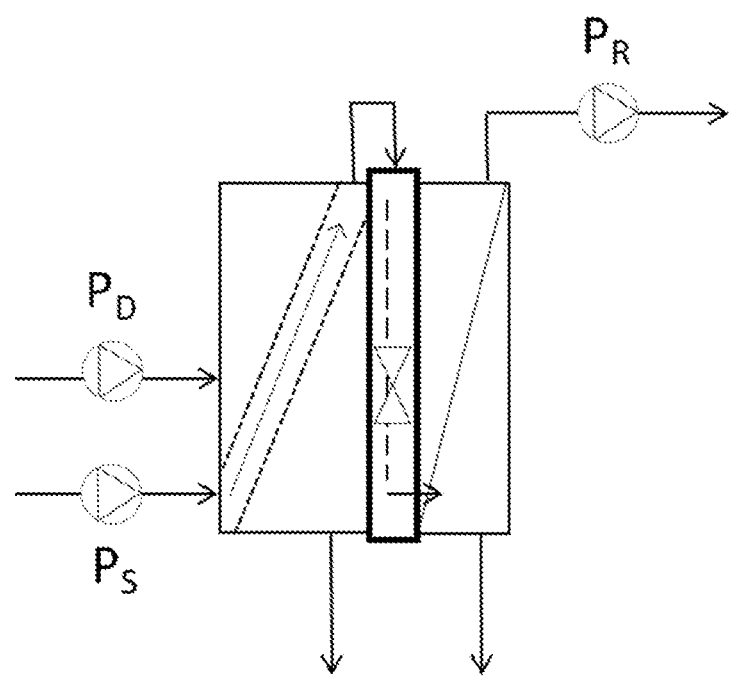
FIG. 10 shows a cross-flow diafiltration unit according to the invention with a cross-flow filtration unit connected downstream and a deflection apparatus having a valve.
Figure 11:
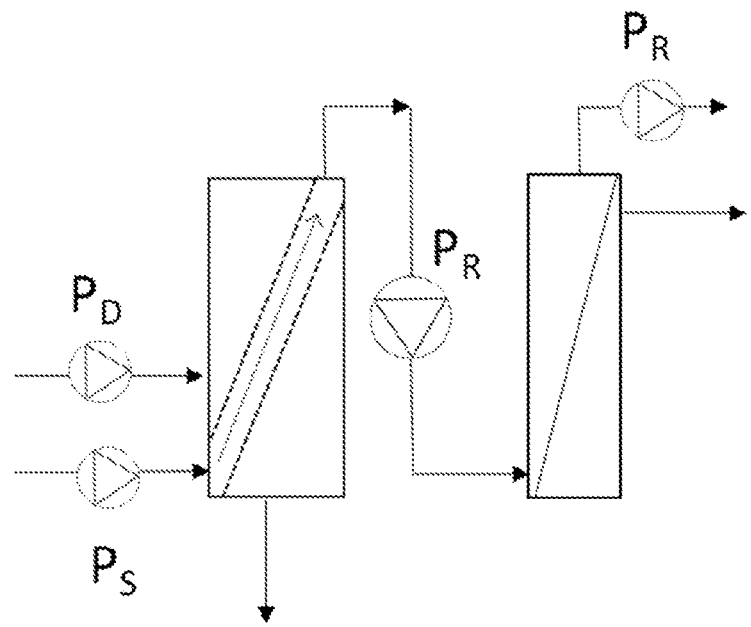
FIG. 11 shows a cross-flow diafiltration unit according to the invention with a cross-flow filtration unit connected downstream and a connection between the cross-flow diafiltration unit and the cross-flow filtration unit having a pump. The cross-flow filtration unit and the cross-flow diafiltration unit can be fixed with the aid of holders.
Figure 12:
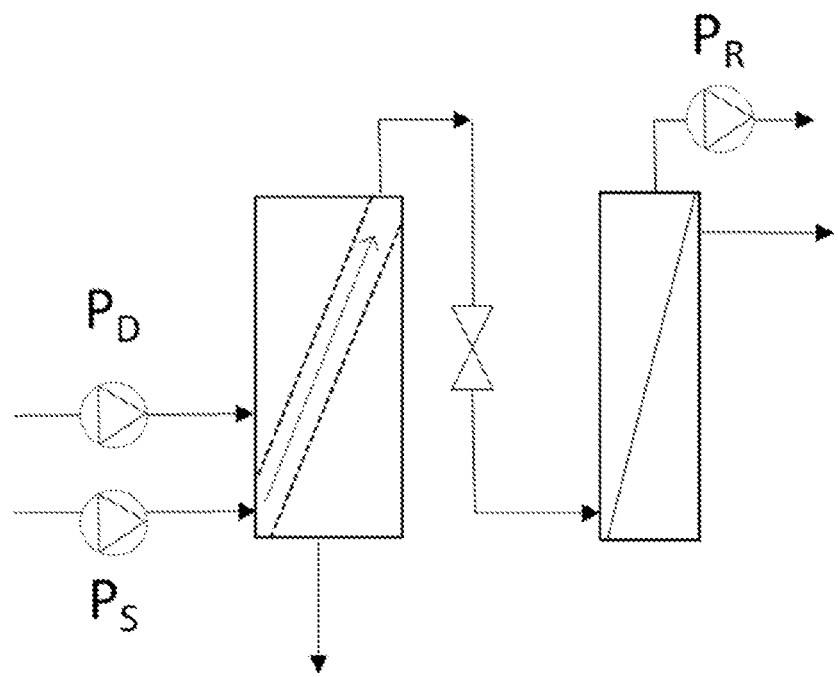
FIG. 12 shows a cross-flow diafiltration unit according to the invention with a cross-flow filtration unit connected downstream and a connection between the cross-flow diafiltration unit and the cross-flow filtration unit having a valve. The cross-flow filtration unit and the cross-flow diafiltration unit can be fixed with the aid of holders.
Figure 13:
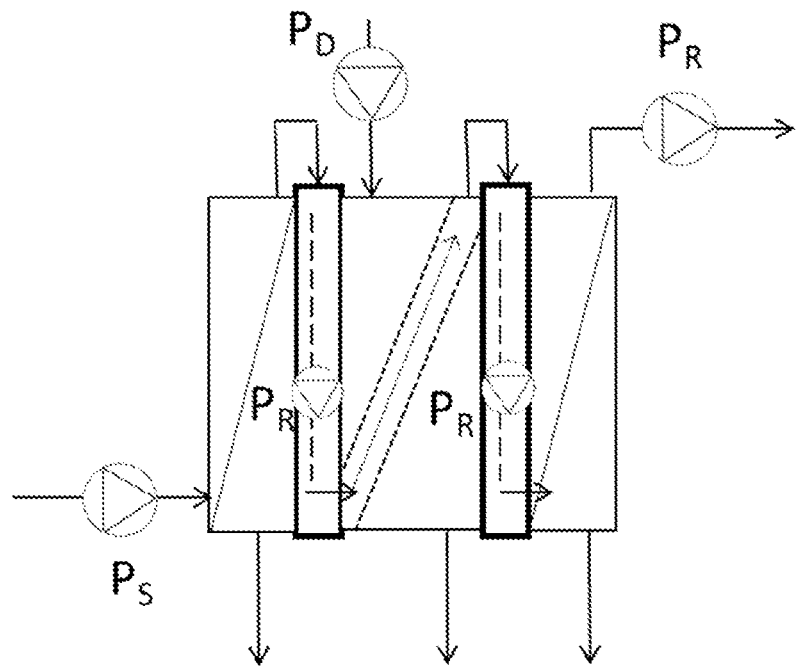
FIG. 13 shows a cross-flow diafiltration unit according to the invention with a cross-flow filtration unit connected respectively upstream and downstream and deflection apparatuses having a pump.
Figure 14:
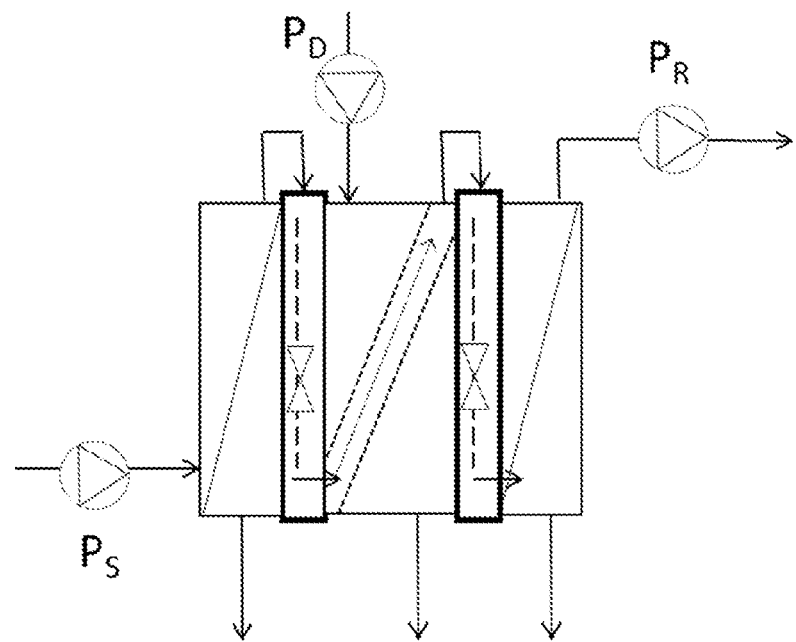
FIG. 14 shows a cross-flow diafiltration unit according to the invention with a cross-flow filtration unit connected respectively upstream and downstream and deflection apparatuses having a valve.

What is claimed is:

1. A method for degassing a cross-flow diafiltration unit, comprising, in sequence:
   (i) providing a cross-flow diafiltration unit having a diafiltration channel, a retentate channel and a permeate channel, a first filter material that delimits the diafiltration channel from the retentate channel, and a second filter material that delimits the retentate channel from the permeate channel; and
   (ii) feeding a liquid into the retentate channel so that the liquid flows in a flow direction through the retentate channel and penetrates through the first filter material into the diafiltration channel, whereby the retentate channel and the diafiltration channel are filled with and degassed by the liquid.

2. The method according to claim 1,
   wherein, with respect to a direction of gravity, in said step (ii), the flow direction of the liquid in the retentate channel assumes an angle of more than or less than 90° to the direction of gravity.

3. The method according to claim 1,
   wherein the cross-flow diafiltration unit provided in said step (i) additionally has a pump configured to operate bi-directionally, and wherein the diafiltration channel is connected to the pump in a fluid conducting manner; and
   wherein, in said step (ii), the pump pumps out the liquid from the diafiltration channel.

4. The method according to claim 1,
   wherein in said step (ii), the liquid is fed into the retentate channel so that the liquid penetrates through the first filter material into the diafiltration channel and through the second filter material into the permeate channel, whereby the retentate channel, the diafiltration channel and the permeate channel are filled with and degassed by the liquid.

5. The method according to claim 1,
   wherein in said step (ii)
   the volume flow of the liquid that is fed to the retentate channel is greater than the volume flow of the liquid that is discharged from the diafiltration channel, and
   the volume flow of the liquid that is discharged from the diafiltration channel is greater than the volume flow of the liquid that is discharged from the retentate channel.

6. The method according to claim 1, further comprising, after said step (ii), further comprising:
- (iii) feeding the liquid into the retentate channel and into the diafiltration channel so that the liquid passes out of the diafiltration channel into the retentate channel and out of the retentate channel into the permeate channel.

7. A cross-flow diafiltration method, comprising:
- degassing the cross-flow diafiltration unit according to claim 1;
- (iv) feeding a feed liquid into the retentate channel;
- (v) discharging a retentate from the retentate channel;
- (vi) feeding a diafiltration medium into the diafiltration channel; and
- (vii) discharging a permeate from the permeate channel.

8. The cross-flow diafiltration method according to claim 7, further comprising:
- sanitizing the cross-flow diafiltration unit before said step (iv) by rinsing with a sanitizing solution.

9. The cross-flow diafiltration method according to claim 8, further comprising:
- rinsing the cross-flow diafiltration unit with a rinsing solution after said sanitizing.

10. The cross-flow diafiltration method according to claim 7, further comprising:
- rinsing the cross-flow diafiltration unit with a rinsing solution before said step (iv).

11. A cross-flow diafiltration unit comprising:
- a diafiltration channel, a retentate channel and a permeate channel, and
- a first filter material that delimits the diafiltration channel from the retentate channel, and a second filter material that delimits the retentate channel from the permeate channel,
- wherein the diafiltration channel is connected in a fluid conducting manner to a pump configured to operate bi-directionally.

* * * * *